(12) United States Patent
Sun et al.

(10) Patent No.: US 8,709,602 B2
(45) Date of Patent: Apr. 29, 2014

(54) ONE-DIMENSIONAL METAL NANOSTRUCTURES

(75) Inventors: Xueliang Sun, London (CA); Ruying Li, London (CA); Yuqin Zhou, London (CA); Mei Cai, Bloomfield Hills, MI (US); Hao Liu, London (CA)

(73) Assignees: GM Global Technology Operations LLC, Detroit, MI (US); The University of Western Ontario, London, Ontario (CA)

( * ) Notice: Subject to any disclaimer, the term of this patent is extended or adjusted under 35 U.S.C. 154(b) by 0 days.

(21) Appl. No.: 13/572,820

(22) Filed: Aug. 13, 2012

(65) Prior Publication Data
US 2012/0308818 A1 Dec. 6, 2012

Related U.S. Application Data

(62) Division of application No. 12/859,352, filed on Aug. 19, 2010, now Pat. No. 8,263,180, which is a division of application No. 11/850,860, filed on Sep. 6, 2007, now Pat. No. 8,034,408.

(60) Provisional application No. 60/824,910, filed on Sep. 8, 2006.

(51) Int. Cl.
*B32B 9/00* (2006.01)

(52) U.S. Cl.
USPC .......................................... 428/408; 423/448

(58) Field of Classification Search
CPC ....................................................... B32B 9/00
USPC ............................ 428/408; 977/742; 423/448
See application file for complete search history.

(56) References Cited

U.S. PATENT DOCUMENTS

| 7,754,183 B2 | 7/2010 | Keskar et al. |
| 2001/0051367 A1 * | 12/2001 | Kiang ........................... 435/182 |
| 2002/0100581 A1 * | 8/2002 | Knowles et al. .............. 165/185 |

OTHER PUBLICATIONS

Jianwei Liu et al.; Water-Assisted Growth of Aligned Carbon Nanotube-ZnO Heterojunction Arrays; Advanced Materials; 2006, 18, 1740-1744.
JR H. He et al.; Beaklike $SnO_2$ Nanorods with Strong Photoluminescent and Field-Emission Properties; full papers; Tin oxide nanorods; DOI: 10.1002.smll.200500210; 2006 Wiley-VCH Verlag GmbH & Co., KGaA, D-69451 Weinheim; small 2006, 2, No. 1, 116-120.
Yung-Jung Hsu et al.; Vapor-Solid Growth of Sn Nanowires: Growth Mechanism and Superconductivity; J. Phys. Chem. B 2005, 109, 4398-4403.
S.H. Jo et al.; Field emission of zinc oxide nanowires grown on carbon cloth; 2004 American Institute of Physics; Applied Physics Letters; vol. 85, No. 8, pp. 1407-1409.
H Y Dang et al.; The synthesis of metal oxide nanowires by directly heating metal samples in appropriate oxygen atmospheres; 2003 Institutes of Physics Publishing; Nanothechnology 14 (2003) 738-741.

* cited by examiner

*Primary Examiner* — Maria Veronica Ewald
*Assistant Examiner* — Daniel H Miller
(74) *Attorney, Agent, or Firm* — Reising Ethington P.C.

(57) ABSTRACT

Tin powder is heated in a flowing stream of an inert gas, such as argon, containing a small concentration of carbon-containing gas, at a temperature to produce metal vapor. The tin deposits as liquid on a substrate, and reacts with the carbon-containing gas to form carbon nanotubes in the liquid tin. Upon cooling and solidification, a composite of tin nanowires bearing coatings of carbon nanotubes is formed.

5 Claims, 17 Drawing Sheets

ONE-DIMENSIONAL METAL NANOSTRUCTURES

This application is a divisional of application Ser. No. 12/859,352, filed Aug. 19, 2010 now U.S. Pat. No. 8,263,180 issued on Sep. 11, 2012, which is a divisional application of application Ser. No. 11/850,860, filed Sep. 6, 2007, now U.S. Pat. No. 8,034,408 issued on Oct. 11, 2011, which claims the benefit of U.S. Provisional Application No. 60/824,910, titled "One Dimensional Metal and Metal Oxide Nanostructures," filed Sep. 8, 2006, the contents of which are incorporated herein by reference.

TECHNICAL FIELD

This disclosure pertains to one-dimensional metal and metal oxide nanostructures (for example, structures of tin, tin oxide, titanium oxide, and tungsten oxide) with variable compositions and morphologies. This disclosure also pertains to methods for making and doping nanostructures in forms such as wires, rods, needles, and flowers.

BACKGROUND OF THE INVENTION

Nanostructured materials (i.e., structures with at least one dimension in the range of 1-100 nm) have attracted steadily growing interest due to their unique, properties and potential applications complementary to three-dimensional bulk materials. Dimensionality plays a critical role in determining the properties of materials due to, for example, the different ways that electrons interact in three-dimensional (3D), two-dimensional (2D), one-dimensional (1D), and zero-dimensional (0D) structures. Compared with 0D nanostructures (so-called quantum dots or nano-particles) and 2D nanostructures (thin films), 1D nanostructures (including carbon nanotubes (CNTs) and nanowires (NWs)) are ideal as model systems for investigating the dependence of electronic transport, optical, and mechanical properties on size confinement and dimensionality as well as for various potential applications, including composite materials, electrode materials, field emitters, nanoelectronics, and nanoscale sensors.

Nanowires are a class of newer one-dimensional nanomaterials with a high aspect ratio (length-to-diameter typically greater than 10). They have interest separately from carbon nanotubes. Nanowires can be made of various compositions of materials in addition to carbon. Nanowires have demonstrated superior electrical, optical, mechanical and thermal properties. For example, the ultrahigh-strength of gold nanowires has recently been demonstrated. The significant increase in strength is due to reduced defects in the crystal structure and a smaller number of grains crossing the diameter of the nanowires. The broad choice of various crystalline materials and doping methods makes the properties (e.g. electrical) of nanowires tunable with a high degree of freedom and precision.

Nanowires consist of a variety of inorganic materials including elemental semiconductors (Si, Ge, and B), Group III-V semiconductors (GaN, GaAs, GaP, InP, InAs), Group II-VI semiconductors (ZnS, ZnSe, CdS, CdSe), and metal oxides (ZnO, MgO, $SiO_2$, $Al_2O_3$, $SnO_2$, $WO_3$, $TiO_2$). Among them, metal oxide nanowires have obvious advantages for some special applications due to their unique properties such as strong chemical interaction with metallic components. This phenomenon is sometimes explained as strong metal-support interaction. Significant progress has been reported in the use of metal oxide nanowires and nanobelts as sensors and in other electronic applications.

Substantially one-dimensional nanostructures (e.g. nanowires, nanorods, and nanobelts having a length much larger than thickness) are a new class of nanomaterials. Synthesis methods for such nanostructures usually fall into two categories: vapor-phase deposition or solution-based crystal growth. While solution-based syntheses generally offer better control of processing conditions and more easily achieve higher productivity, vapor deposition often yields higher aspect ratios (for example, length-to-width or length-to-diameter ratios) and excellent crystallinity due to the higher growth temperatures. However, one of the prominent current challenges is in controlling the synthesis of metal oxide nanostructures in ways that allow variation in their morphology. This would permit exploration of different potential materials applications of the nanostructures as their shapes are changed.

SUMMARY OF THE INVENTION

Metals and metal oxides are formed in substantially one-dimensional nanostructures having a variety of shapes such as wires, rods, needles, belts, and flowers (wires or rods joined at a center and extending like radiating petals). Nanowires and rods have a uniform diameter from end to end while nanoneedles have sharp tips. These nanostructures have a high aspect ratio (e.g., ratio of length to diameter or thickness of ten or greater) where the smaller dimension is in the range of one to one hundred nanometers. Examples of metals that may be processed by practices disclosed in this specification include tin, titanium, and tungsten.

In a first embodiment, a powder of the metal is heated in a stream of an inert gas such as argon. Suitable temperatures are often in the range of about 700° C. to about 1000° C. The metal powder is heated to a suitable temperature at which it produces a quantity of vapor (e.g., tin), and the inert gas contains a small amount of oxygen molecules (for example in parts per million). Oxygen reacts with the hot metal vapor to form oxidized metal which is solid at the reaction temperature and deposits as one-dimensional nanostructures on a nearby substrate. When the metal produces little vapor at the temperature of the chamber (e.g., titanium and tungsten) the one-dimensional nanostructures may be grown directly on the metal powder.

The oxygen content of the inert gas stream may be low enough such that non-stoichiometric metal oxides are formed. For example, oxygen-containing metal compositions such as SnOx, TiOx and WOx may be formed where "x" is not an integer reflecting a common oxide such as SnO, $SnO_2$, $TiO_2$, $WO_3$, etc.

Oxygen for oxidation of the metal powder particles is obtained from one or more several sources, including: oxygen initially absorbed on the starting metal material; the controlled addition of oxygen into the flowing inert gas; leakage of air into the inert gas; and/or humidification of the inert gas to add water molecules, some of which dissociate to oxygen and hydrogen in the hot reaction medium.

The metal oxide nanostructures may be doped with sulfur, carbon, or the like by adding the doping element to the inert gas stream flowing over the vapor-generating metal powder. Sulfur may be vaporized into the inert gas upstream of the metal powder. A hydrocarbon gas such as methane, ethylene or acetylene may be added to the inert gas upstream of the metal powder.

A tubular flow reactor heated by an enclosing electric furnace may provide a suitable reaction system. In this embodiment a container for the powder is placed within the heated zone of the tubular reactor and a suitable substrate for nanostructure growth is provided at a suitable location near the metal powder. The one-dimensional nanostructure shape taken by the condensing oxygen-containing metal is found to depend on the parameters of the reacting system, including the location of substrate material and nature of dopant material if it is employed.

In another embodiment of the invention, composites of carbon nanotubes containing tin nanowires are formed when a stream of argon containing, for example, about 2% ethylene is passed over tin powder in a reaction vessel at 900° C. The composite of one-dimensional nanostructures may be formed on a substrate such as carbon fiber paper. In this embodiment, the low-melting tin vapor is deposited as liquid droplets on the carbon fiber substrate. The tin droplets catalyze the decomposition of ethylene and the formation of carbon nanotubes. Upon cooling of the reactor the liquid tin droplets solidify and shrink as one-dimensional tin nanowires within the carbon nanotubes.

The resulting one dimensional metal-carbon composite nanostructures and one-dimensional metal-oxygen nanostructures have utility, for example, in electrical/electronic applications and as catalyst supports.

Other objects and advantages of the invention will be apparent from descriptions of preferred embodiments which are presented in the following specification.

DESCRIPTION OF PREFERRED EMBODIMENTS

The following experimental procedures were followed in the preparation of one-dimensional nanostructures of the oxides of tin ($SnO_x$), titanium ($TiO_x$), and tungsten ($WO_x$), respectively, starting with commercial powders of tin, titanium, and tungsten as obtained from Aldrich Chemical Company.

Nano structures, nanowires, nanorods, nanobelts and nanoneedles, of metal oxide $SnO_x$, $WO_x$ and $TiO_x$ were synthesized by a chemical vapor deposition method. Here, the values of x are usually greater than zero and up to, for example, three or greater, depending on the oxidation state of the metal. The values are not necessarily integer values and do not necessarily represent stoichiometric compounds. In some instances nanostructures of the metal were obtained.

Figure 1A:
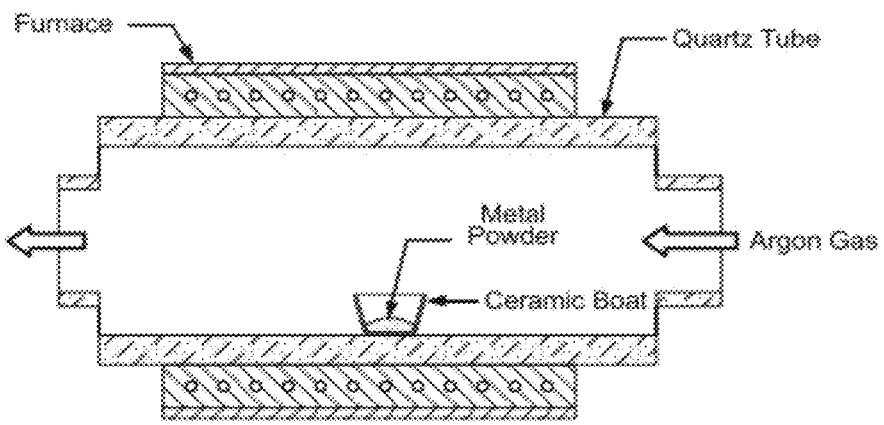
FIG. 1A is a schematic diagram of a chemical vapor deposition (CVD) reactor device to grow non-doped metal or metal oxide nanostructures in a flowing stream of oxygen-containing argon.

The experimental setup (see FIGS. 1A-1C) included a horizontal tube furnace with an electrically resistance heated zone of about 30 cm in length. A quartz tube, 60 cm long, was centered along its length and enclosed in the furnace. Provision was made for the controlled flow of argon gas into one end of the tube (right end in FIGS. 1A, 1B, and 1C) and through the quartz tube to provide an atmosphere with relatively low oxygen content for the formation and growth of oxygen-containing metal nano structures.

In a typical procedure, the metal powder (Sn, Ti, or W powder) was placed in an alumina boat (labeled in FIG. 1A) and located at the midpoint of the quartz tube and tube furnace. High purity argon (99.999%) was flowed through the quartz tube at a rate of 50 sccm (standard cubic centimeters per minute) for 15 min to remove $O_2$ and other gases from the quartz tube chamber. The argon, initially at an ambient temperature, was rapidly heated within the hot tube furnace and partially enclosed quartz tube. The vapor deposition chamber thus provided in the quartz tube, and the argon gas flowing through it, were heated from room temperature to relatively high temperatures (700-1000° C.). Tin is liquid at these temperatures while titanium and tungsten are solid.

A small amount of oxygen was required to react with the metal powder, or vapor from the hot metal, and slowly produce the respective particulate metal oxide materials, which were not necessarily stoichiometric compounds. The metal particles (typically about 99.8% by weight of the respective metal) inherently initially contained a thin adsorbed coating of oxygen molecules. Additional oxygen was obtained to grow the metal oxide nanostructures from the very small residual oxygen content of the argon and from a low rate of oxygen leakage from the ends of the quartz tube. These small oxygen sources were sufficient to slowly oxidize the metal particles and oxygen-containing metal nanostructures were formed. They typically formed on powder particles (e.g., Ti and W) in the ceramic boat, on the sides of the ceramic boat, or on another nearby substrate provided for nanoscale particle growth (e.g., in the case of the liquid tin).

After growing the metal or metal oxide nanostructures for a period of time (e.g., 1-4 hrs), the furnace was cooled down to room temperature as the flow of argon was continued.

Carbon paper was used as a substrate for growth of SnOx nanostructures. The commercially-used carbon paper is a class of electrode materials for various applications such as fuel cells and sensors. A piece of the carbon paper was paced on the ceramic boat shown in FIG. 1A.

WOx and TiOx nanostructures, in the form of free-standing powder, could be synthesized directly from and on their powder as a result of their relatively high melting points and relatively low vapor pressure at reaction conditions.

Water as an Oxygen Source

In order to increase and further control the amount of oxygen during the synthesis, water was introduced with argon gas during some of the metal oxide synthesis experiments. In the water-assisted oxidation reactions, the argon flow from its storage tank was bubbled through a hot water bath (80° C.) and then flowed into the quartz tube so that water vapor was continuously carried into the reaction zone. The water dissociated (partially) in the hot tube to provide additional oxygen for synthesis of the one-dimensional nanostructures. The control of water amount was managed by the temperature of the water and/or the flow rate and dispersion of the bubbled inert gas. The water-assisted oxidation reaction is very effective for the growth of $WO_x$ and $TiO_x$ nanostructures from their metal powders.

In-Situ Doping of the Metal Oxide Nanostructures with Sulfur

Figure 1B:
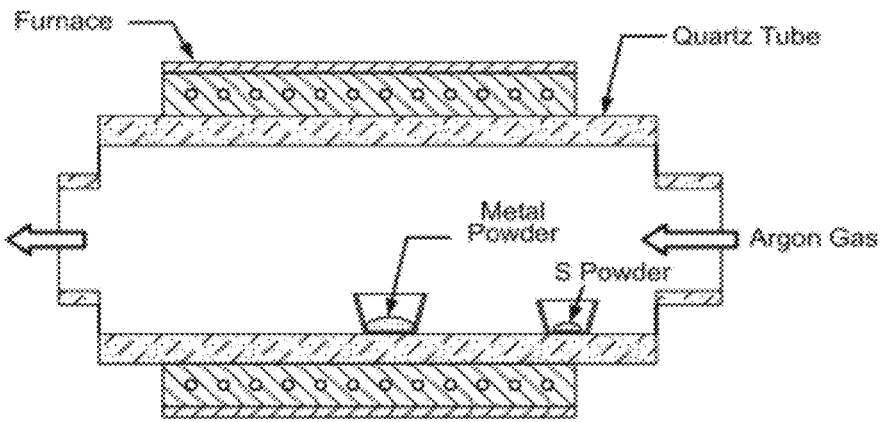
FIG. 1B is a schematic diagram, like FIG. 1A for growing sulfur-doped metal or metal oxide nanostructures by evaporating sulfur powder.

In some experiments the nanostructures were doped with sulfur to modify electrical properties of nanostructures and/or the interaction of the metal oxide nanoparticles with subsequently deposited catalyst particles. In-situ sulfur-doping was conducted by placing a container of sulfur powder upstream of the metal powder (with respect to the direction of flow of the inert gas) as shown in FIG. 1B. The sulfur readily vaporized in the heated quartz reactor and was carried in the flowing argon into contact with the oxidized (and oxidizing) metal particles. The sulfur vapor diffused into the metal oxide nanostructures as a dopant element.

Sulfur-doped WOx nanostructures were typically obtained by the CVD process with the furnace at 760° C. and an argon stream (flow rate, 100 sccm, initially bubbled through hot water at 80° C.) passed through the heated quartz tube for 1-4 hrs. A ratio of sulfur to WOx (molar ratio W/S) was about 3:1.

In-Situ Doping of Carbon into Nanostructures.

Figure 1C:
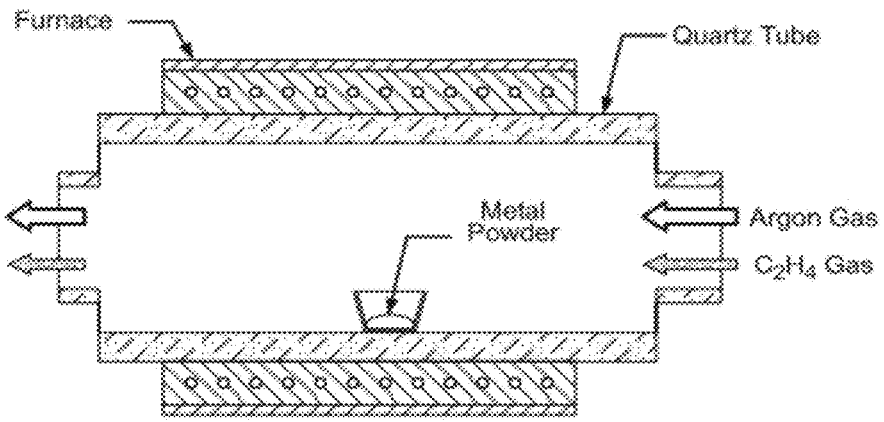
FIG. 1C is a schematic diagram, like FIG. 1A, for growing carbon-doped metal or metal oxide nanostructures by introducing ethylene gas.

There is also interest in doping small metal oxide particles with carbon with the goal of modifying their properties, for example their electrical and anti-corrosion properties. Here, carbon-doping was carried out in three different ways: (i) a hydrocarbon gas (e.g. $C_2H_4$, $CH_4$, $C_2H_2$) was mixed with argon, as shown in FIG. 1C; (ii) a carbon-containing liquid (e.g. acetone, methanol and ethanol) was mixed with the argon stream by a bubbler (a similar procedure to water); and (iii) a solid (e.g. graphite and carbon nanotubes) were mixed with metal powder.

For example, carbon-doped $SnO_2$ was prepared by introducing ethylene gas ($C_2H_4$) into flowing argon (200 sccm) for 2-4 hrs with the furnace at 900° C. Carbon-doped $WO_3$ was obtained from 100 sccm Ar with 2 sccm $C_2H_4$ at 760 C for 1-4 hrs. The argon was also bubbled through water at 80° C. Carbon-doped TiOx was prepared by introducing both water and 30 volume % acetone as a carbon source with 100-200 sccm Ar at 800-900° C. for 2-4 hrs.

Characterization of Nanostructures

The metal oxide nanostructures produced were characterized using a transmission electron microscope (TEM), high-resolution TEM (HRTEM), with electron energy-loss spectroscopy (EELS), energy dispersed X-ray spectroscopy (EDX), as well as with a scanning electron microscope (SEM) and field-emission scanning electron microscope (FE-SEM) with EDX.

Results:

One-dimensional nanostructures of three kinds of metal oxides (SnO, $SnO_2$, $WO_3$ and $TiO_x$), non-doped and doped, were synthesized by the vapor deposition methods described above. The detailed results will be presented according to the following order (i) SnOx, (ii) WOx and (iii) TiOx.

Tin oxide nanostructures with varying amounts of oxygen were prepared. These materials were identified as SnO and $SnO_2$.

1. Synthesis of SnOx (x=0–2) Nanostructures (A) SnO and $SnO_2$ Nanostructures were Grown on Carbon Paper and $Al_2O_3$ Ceramic Substrates.

Figure 2A:
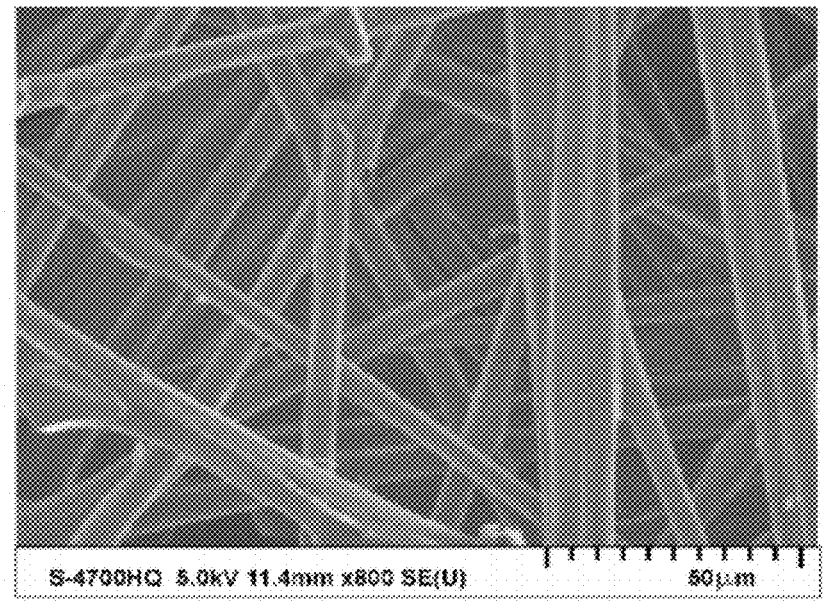
FIG. 2A is a scanning electron microscope (SEM) image of a bare carbon paper substrate.

FIG. 2A is a SEM image of commercially-used and bare carbon paper substrate. The carbon paper is widely used as an electrode material for electrochemical applications such as fuel cell backing and sensors. The carbon paper consists of small carbon fibers of 5-10 μm in diameter and a small piece of the paper was placed on the ceramic (alumina) boat overlying the tin powder in the boat. SnO and $SnO_2$ nanostructures were first synthesized on carbon fibers of the carbon paper substrate at 900° C. under a flow of oxygen-containing argon gas at a flow rate of 200 sccm for 2 hrs.

Figure 2B:
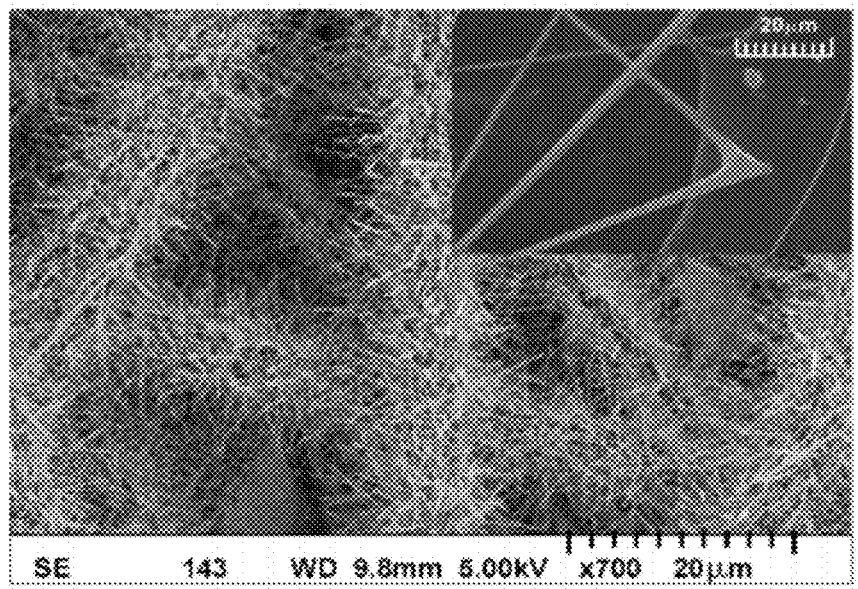
FIG. 2B is an SEM image of SnOx nanowires grown on carbon fibers of a carbon paper substrate.

FIG. 2B portrays SnO, $SnO_2$ nanowires, grown on carbon fibers of carbon paper substrate. The SEM image reveals a high density of the tin-oxygen nanowires that cover the whole surface of carbon fibers. A TEM image inset into a corner of FIG. 2B shows wire-like particles of nanoscale tin oxide particles. Obviously, such a nanostructure will have an appreciable and useful specific surface area.

Figure 2C:
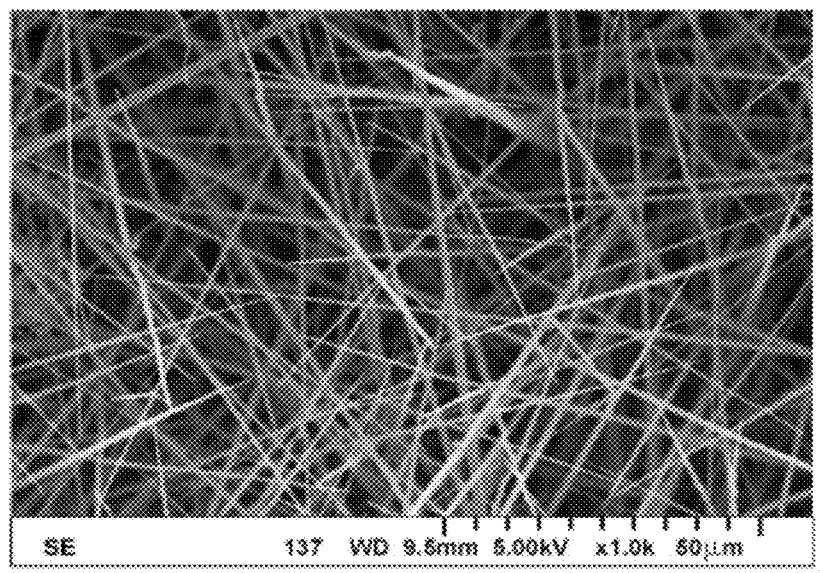
FIG. 2C is an SEM image of SnOx needles grown on a carbon paper substrate.
Figure 2D:
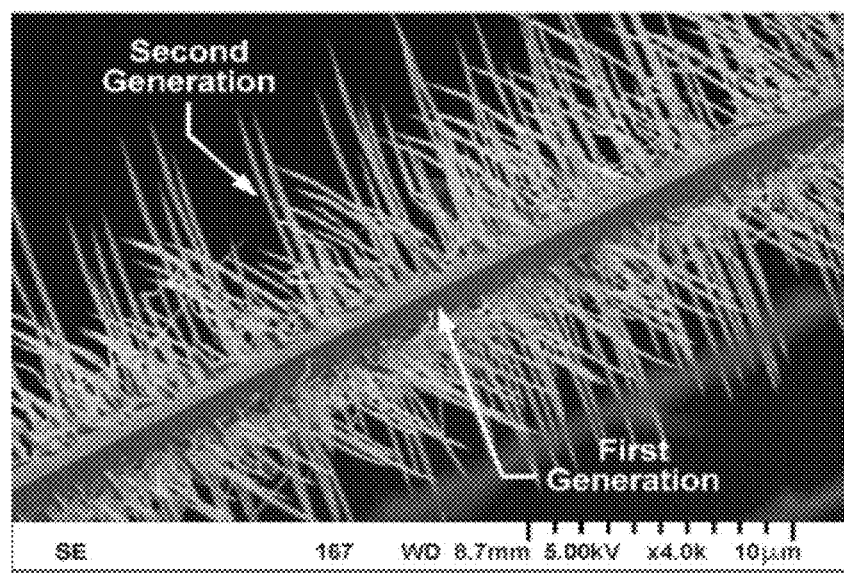
FIG. 2D is an SEM image of two generations of SnOx nanostructures grown on carbon paper substrate.

The morphology of nanostructures can be controlled by changing the distance of sample substrates from powder or molten metal sources. Generally, most growth areas close to the molten Sn source grew wire-like nanostructures. However, some areas more removed from the Sn liquid produced needle-like (pointed ends) nanostructures on carbon paper, as shown in FIG. 2C. In some areas, the second generation of nanoneedles grown on top of the first generation of nanowires in a one-step synthesis process was also observed (FIG. 2D). Further, special orientations between the first and the second generation of nanowires were observed. The needle-like and second-generation structures should be associated with role of carbon from carbon paper and relative higher growth temperature.

Figure 2E:
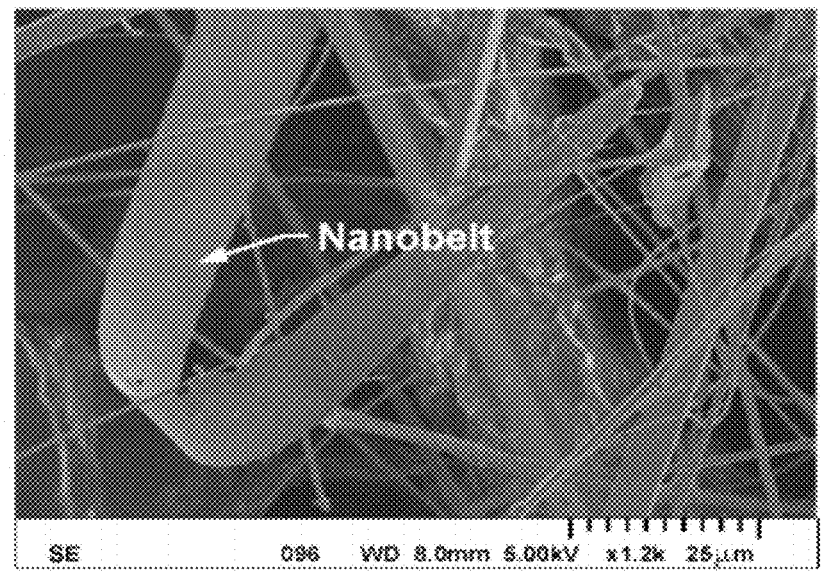
FIG. 2E is an SEM image of SnOx nanobelts in a ceramic boat substrate.
Figure 3A:
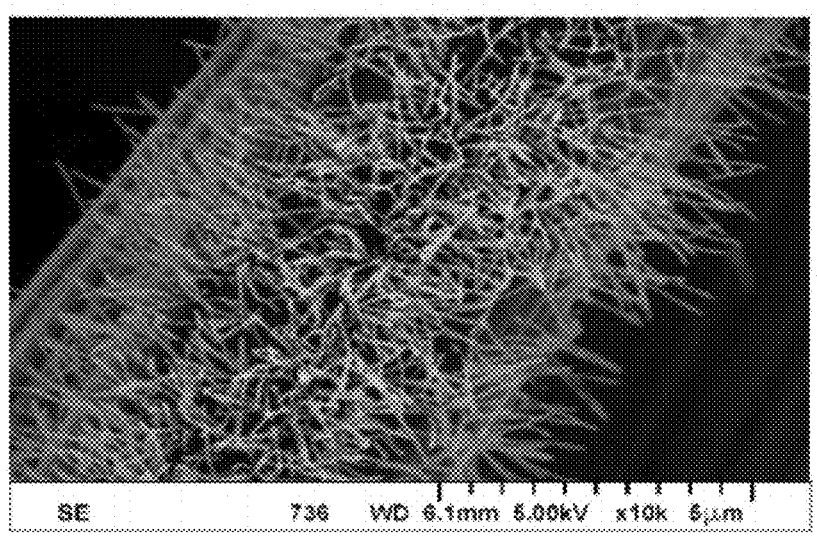
FIG. 3A is an SEM image of carbon-doped $SnO_x$ nanostructures grown on carbon paper substrates under conditions of 900° C., 200 sccm argon gas with 0.5 sccm of ethylene gas ($C_2H_4$) for 2-4 hrs.
Figure 3B:
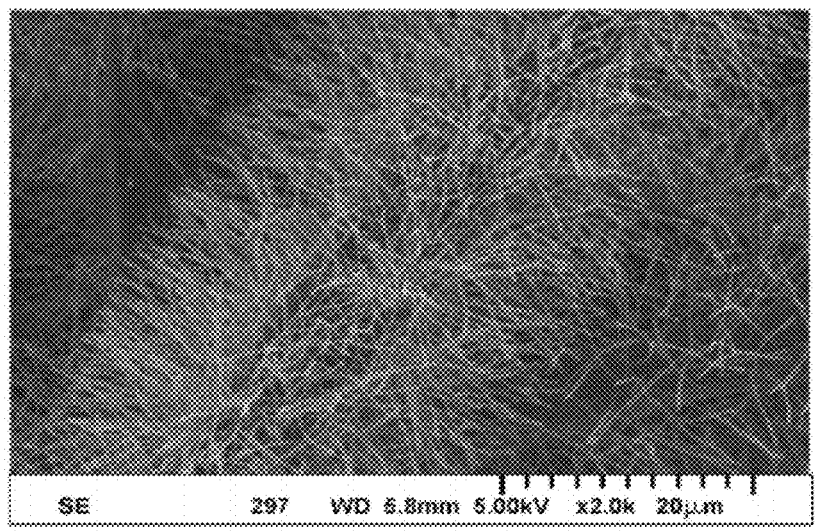
FIG. 3B is an SEM image of carbon-doped $SnO_x$ nanostructures grown like the sample in FIG. 3A with an ethylene gas flow rate of 1 sccm.
Figure 3C:
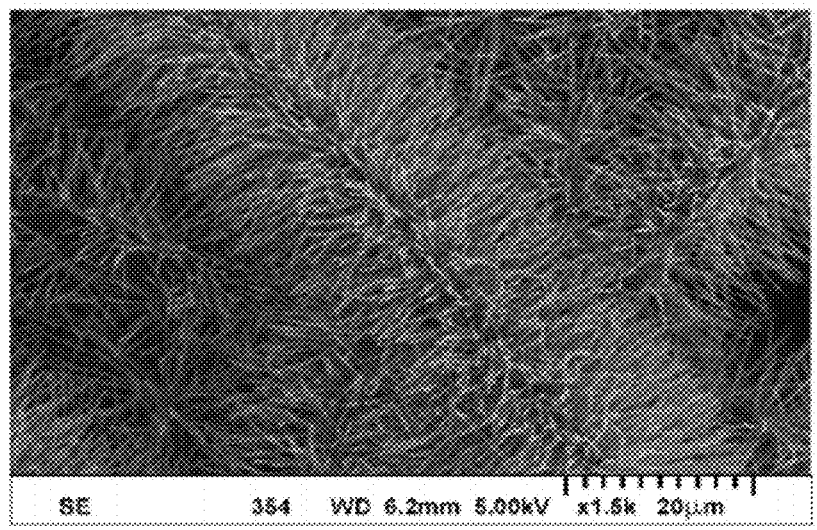
FIG. 3C is an SEM image of carbon-doped $SnO_x$ nanostructures grown like the sample in FIG. 3A with an ethylene gas flow rate of 2 sccm.
Figure 3D:
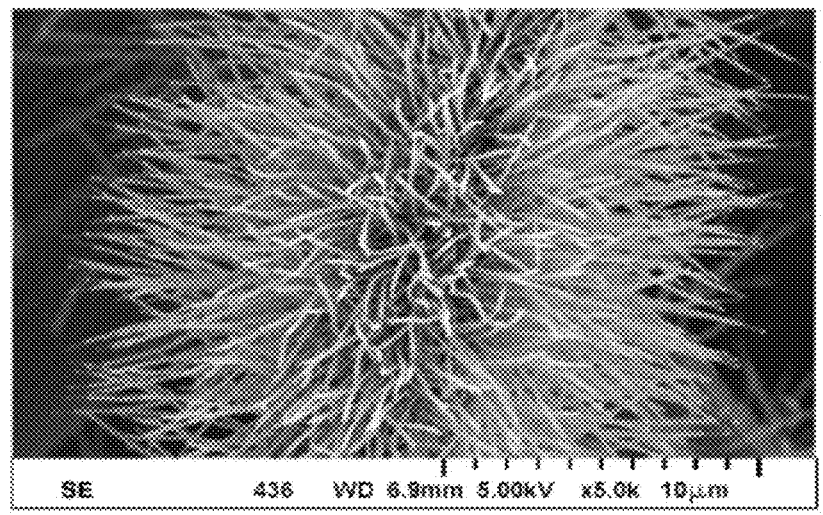
FIG. 3D is an SEM image of carbon-doped $SnO_x$ nanostructures grown like the sample in FIG. 3A with an ethylene gas flow rate of 5 sccm.
Figure 3E:
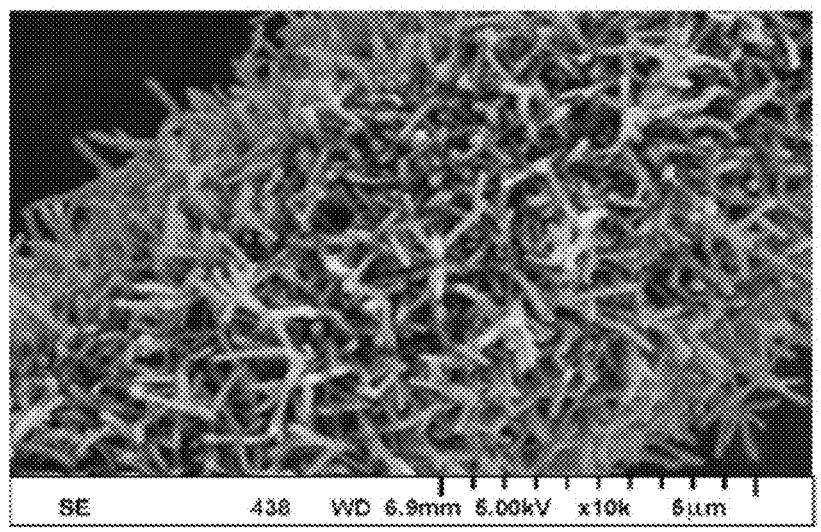
FIG. 3E is an SEM image of carbon-doped $SnO_x$ nanostructures grown like the sample in FIG. 3A with an ethylene gas flow rate of 7 sccm.
Figure 3F:
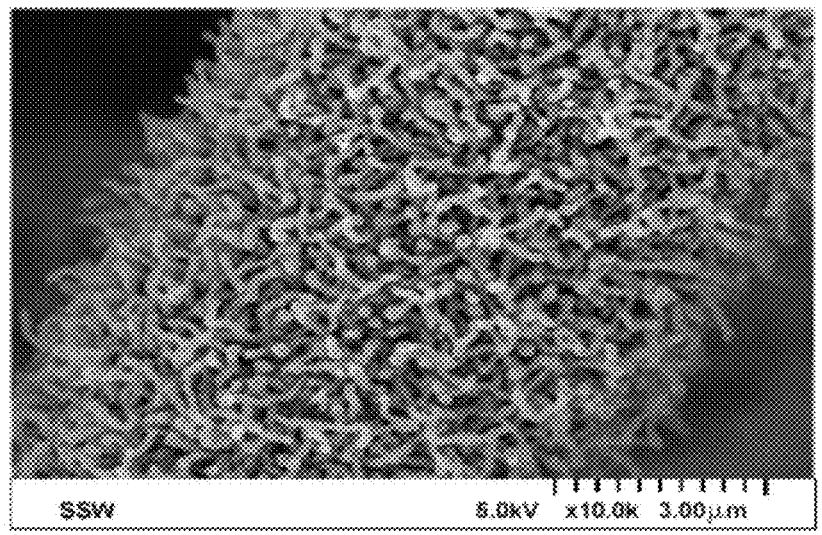
FIG. 3F is an SEM image of carbon-doped $SnO_x$ nanostructures grown like the sample in FIG. 3A with an ethylene gas flow rate of 10 sccm.
Figure 3G:
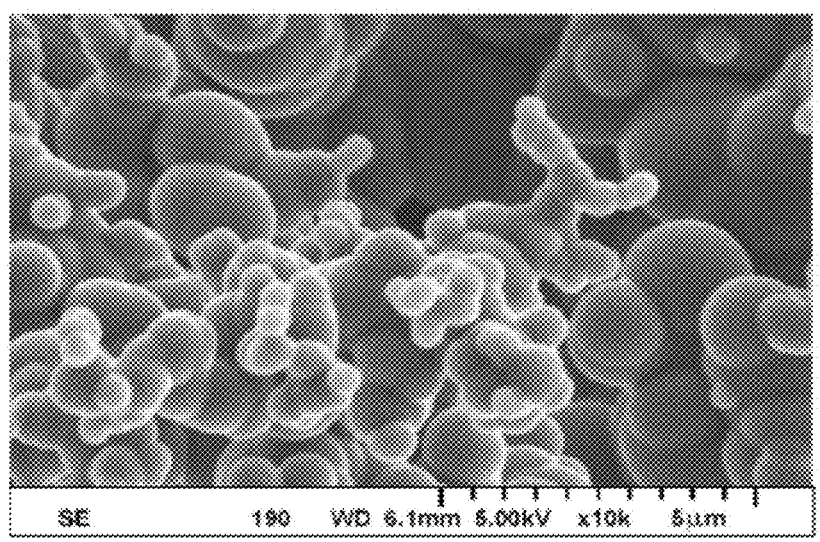
FIG. 3G is an SEM image of carbon-doped $SnO_x$ nanostructures grown like the sample in FIG. 3A with an ethylene gas flow rate of 12 sccm.

When the ceramic boat alone provided the support for the oxidized tin, it was found that the oxygen-containing nanoparticles formed as nanobelts—very thin and 10 μm wide—as illustrated in FIG. 2E.

(B) Carbon-Doped Tin and Carbon Composite Nanostructures were Formed.

To improve electrical properties and corrosion resistance of SnOx nanostructures as well as to understand the role of carbon during growth of nanostructures, an experiment was conducted to produce in-situ carbon-doped SnOx structures by introducing ethylene gas ($C_2H_4$) in the flowing argon. But composites of tin nanowires in carbon nanotubes were obtained. This is a new finding.

While keeping the same vapor deposition conditions as described in the above section (1), 900° C. and 200 sccm argon flow rate, different amounts (0.5 sccm-12 sccm) of carbon were introduced with the argon gas flow. The results showed that the different amounts of carbon resulted in different morphologies and structure of tin and carbon nanostructures on carbon paper as shown in FIGS. 3A through 3G.

FIGS. 3 (A-G) show SEM images of carbon-doped tin nanostructures on carbon paper synthesized in 900 C, 200 sccm Ar and carbon amounts (0.5-12 sccm). In the case of 0.5 sccm ethylene (FIG. 3A), tin and carbon nanostructures grown on a carbon fiber are not very dense and are about 15 μm in length. With the increase of carbon amounts (1-5 sccm) in the argon, the density of tin and carbon nanostructures significantly increase and totally cover the carbon fibers (FIGS. 3B-3D). But the length is still about 15 μm. When the carbon compound flow rates in the argon flow reach 7 and 10 sccm, very short nanoparticles (1-5 μm) were obtained (FIGS. 3E and 3F). For 12 sccm carbon compound flow rate, there was no significant change in the structure of the particles; only more spherical nanostructures were observed (FIG. 3G).

A change of nanostructure morphologies is associated with structural features and composition of carbon-doped SnOx. The detailed analysis will be illustrated in FIGS. 4A through 4F. Basically, carbon graphitic layers were formed on the surface of the intended SnOx nanostructures and metallic Sn nanostructures were obtained. When a sufficient amount of carbon was introduced into the argon gas, the growth of a Sn nanostructure was promoted. When the amount of carbon is too high (12 sccm), carbon limits the growth of the nanostructures. From these results it was recognized that a new nanostructure was obtained when carbon amounts are in a range of 2-5 sccm. Details of these tin and carbon composite structures will be presented in a further description of FIGS. 4A-4F which is presented in the following section of this specification.

(C) Single-Crystalline Tin Nanowires Encapsulated by Carbon Nanotubes were Grown on a Substrate of Carbon Fibers.

Figure 4A:
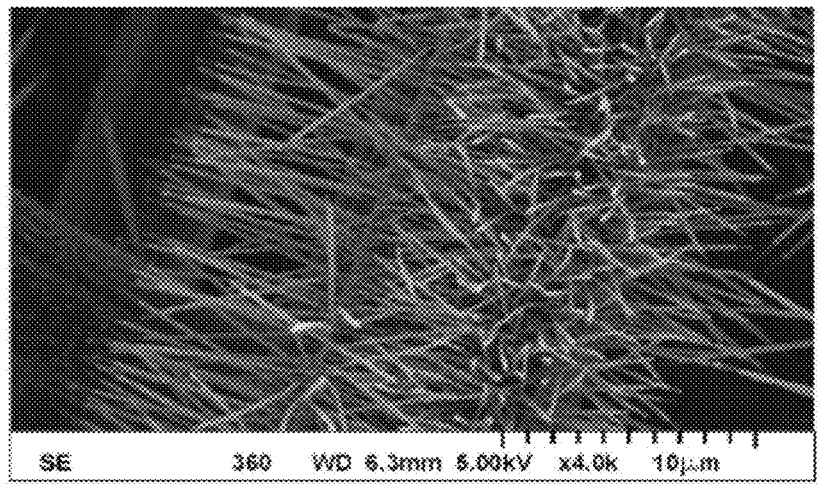
FIG. 4A is a scanning electron microscopic (SEM) image of carbon-coated tin nanostructures on a carbon fiber. The nanostructures in FIGS. 4A-4F were formed by reaction of tin powder with 900° C., 200 sccm Ar gas and 2 sccm ethylene gas for 2 hrs.
Figure 4B:
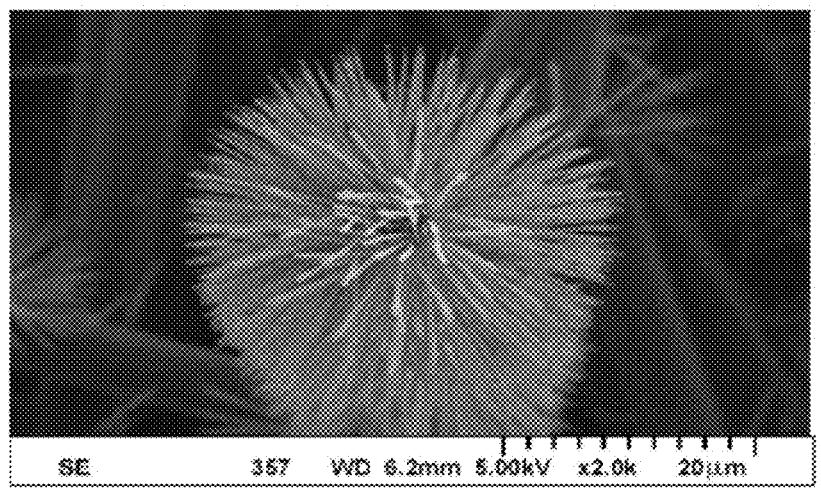
FIG. 4B is an SEM image of a carbon-coated tin nanoflower structure on a carbon fiber.
Figure 4C:
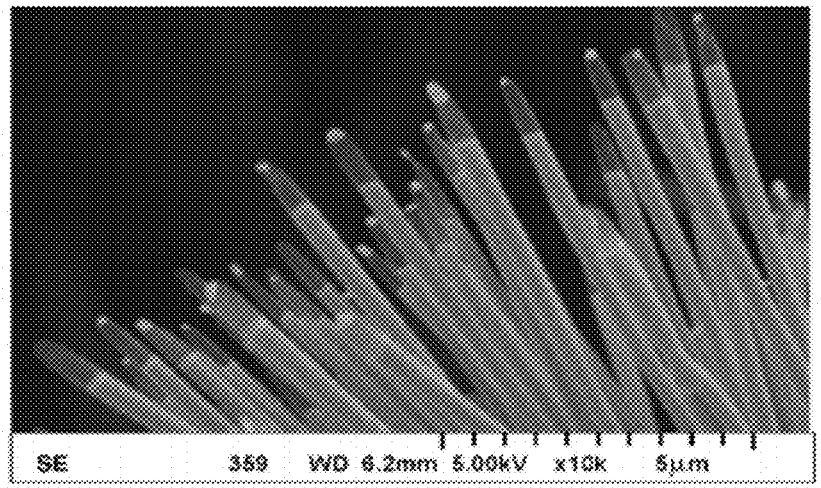
FIG. 4C is an SEM image of tips of carbon-coated tin nanowires.
Figure 4D:
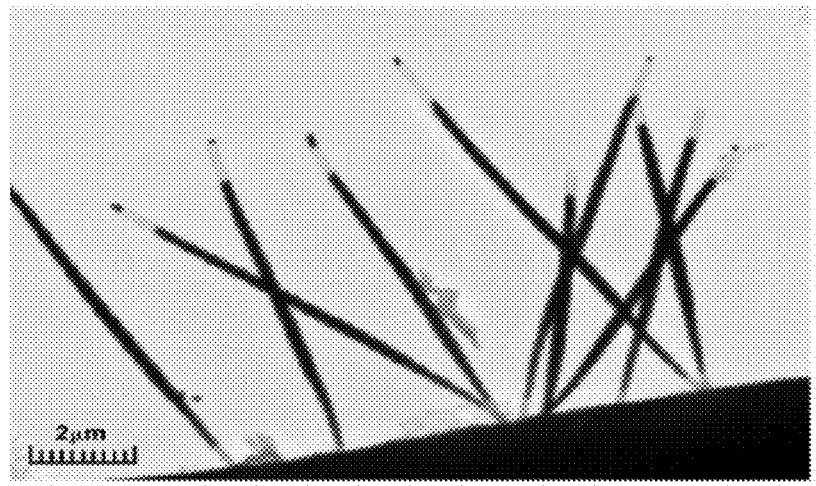
FIG. 4D is a transmission electron microscope image (TEM) of the wires of FIG. 4C showing a portion of the tubes near the tips of the wires.
Figure 4E:
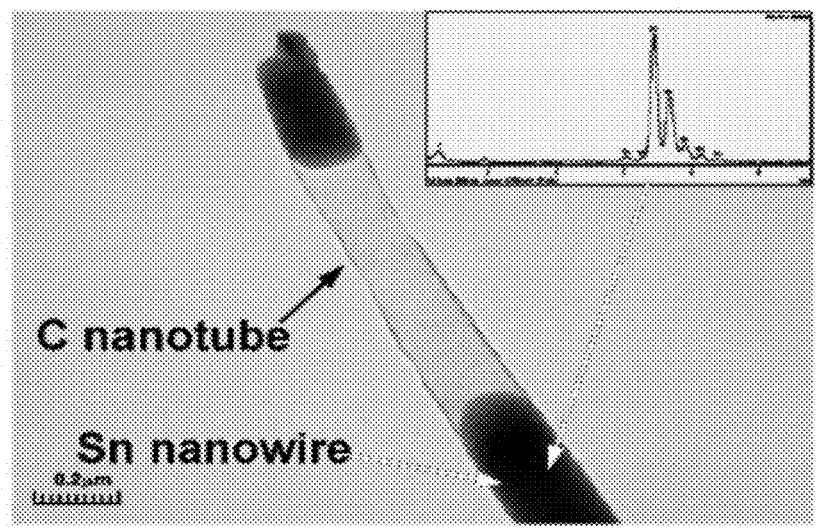
FIG. 4E is a TEM image of an individual tin nanowire showing the carbon nanotube shape near the tip of the wire. The insert in FIG. 4E is an EDX plot confirming the existence of a tin nanowire rather than a SnOx nanowire.
Figure 4F:
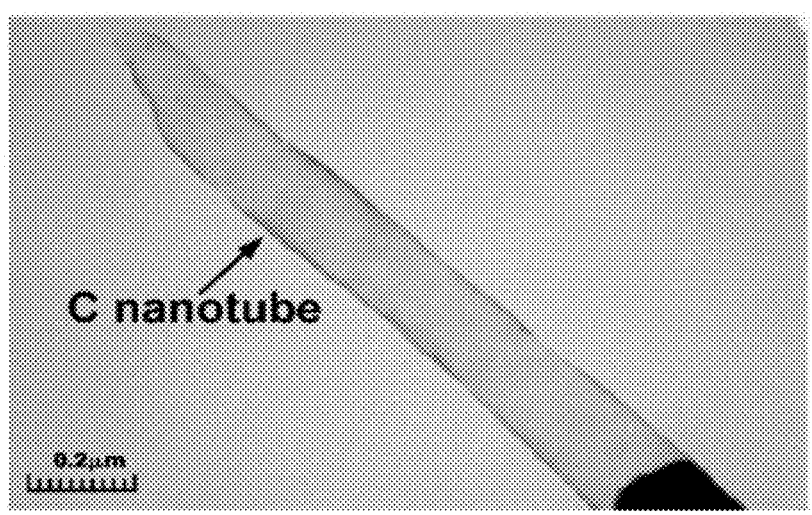
FIG. 4F is a TEM image of an individual tin nanowire showing the tube on the tip.

As mentioned above, a high-density of nanostructure wires was obtained on a carbon fiber substrate when ethylene at flow rates of 2-5 sccm was introduced with the flow of argon. The SEM images of FIGS. 4A and 4B reveal their morphologies. Individual tin fibers are seen in FIG. 4A while the tin fibers are clustered like petals of a flower in some local areas as illustrated in FIG. 4B. However, close observations from SEM and HRTEM (FIGS. 4C and 4D) showed that the nanostructure actually consists of carbon nanotubes (about 30 nm thick) at the tip and bottom of the structures, with tin nanowires in the middle of the fiber-like nanostructures. TEM images in FIGS. 4E and 4F gave more detailed information. In some cases, a carbon nanotube portion (white region labeled as C nanotube in FIG. 4E) appears between nanowire portions, labeled as Sn nanowire. In other cases, hollow nanotubes were found only in the tip of nanostructures (FIG. 4F). The compositional analysis by EDX (inset in FIG. 4E) showed that darker area of the nanowire is composed of tin covered by carbon layers. The tubular portion of the fiber is composed mostly of carbon.

2. Synthesis of $WO_3$ Nanostructures

As discussed in the section 4 (below), the growth mechanisms of $WO_3$ nanostructures are different from the mechanisms for SnO, and $SnO_2$ nanostructures. The growth of SnOx nanostructures follows vaporization of Sn powder followed by oxidation of the tin and condensation of the non-stoichiometric oxide on a substrate like carbon paper. The mechanism is a vapor-to-solid (VS) mechanism. In contrast, $WO_3$ (and TiOx) nanostructures appear to grow directly on W (or Ti) powders. A difference in synthesis of WOx nanostructure is that the water-assisted process oxidation process was used. In this case, the argon flow, prior to entering the chamber, was bubbled through a hot water bath (80° C.) so that $H_2O$ vapor was continuously transferred into the reaction zone. The introduction of water serves to provide more oxygen (maybe $H_2$ as well) during the reaction. The control of water amount was carried out by water bubbling. The water-assisted process is very effective for the growth of $WO_x$ and $TiO_x$ nanostructures. FIGS. 5A-5F show SEM images of WOx, sulfur-doped WOx and carbon-doped WOx nano structures.

Figure 5A:
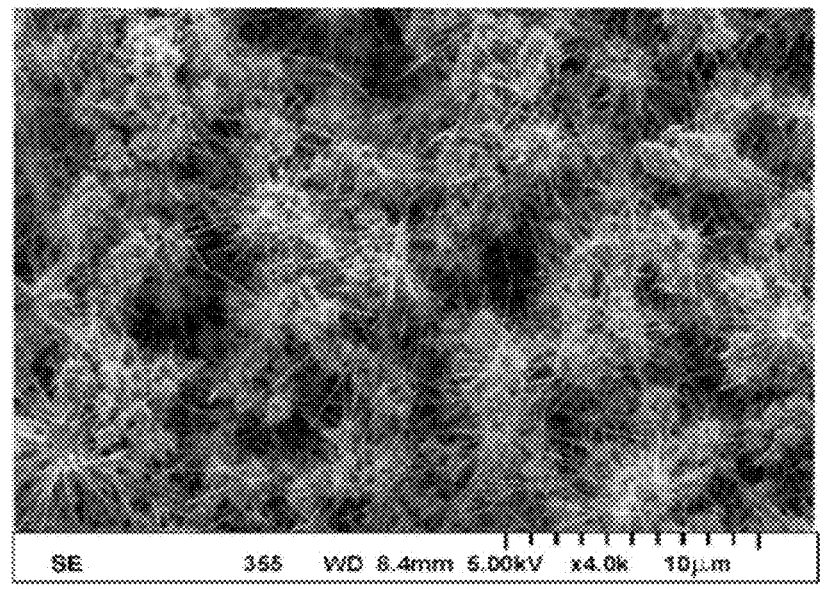
FIGS. 5A and 5B are SEM images of un-doped WOx nanowires at 4000-fold (A) and 12,000-fold (B) magnification, respectively.
Figure 5B:
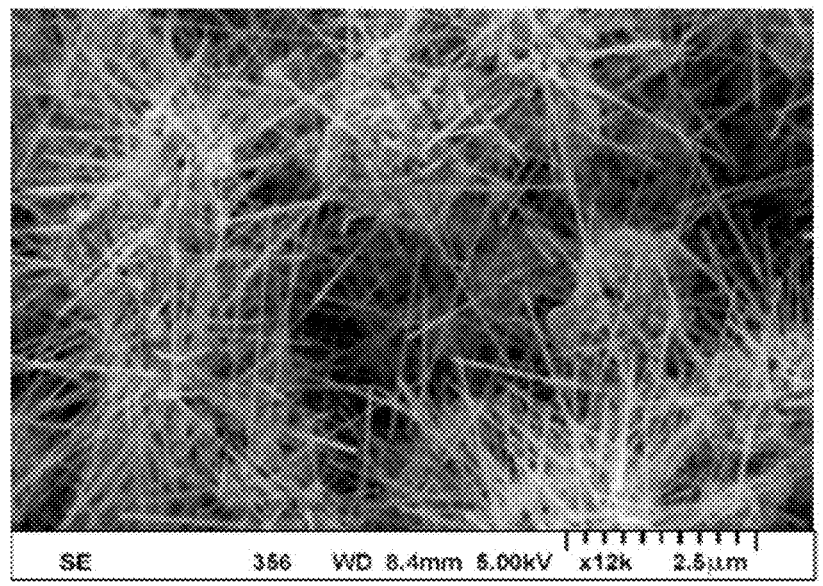
Figure 5C:
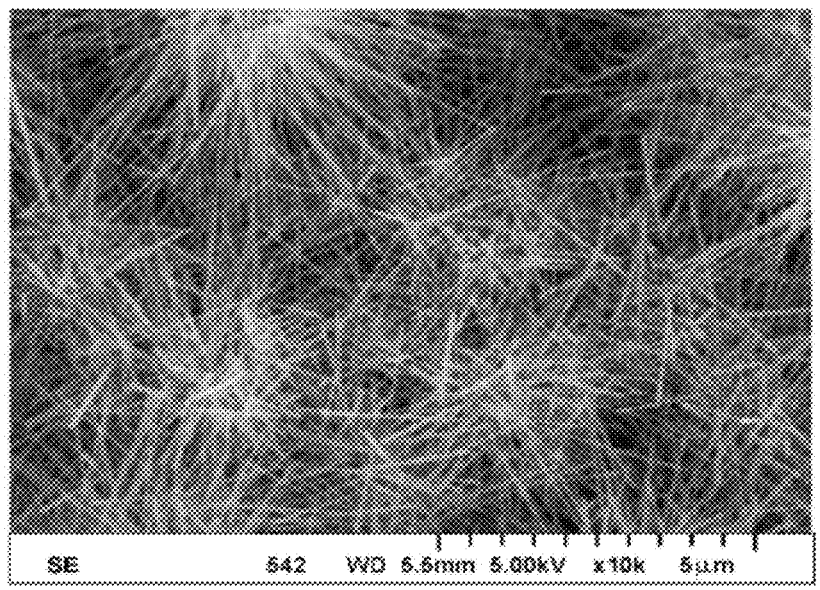
FIGS. 5C and 5D are SEM images of sulfur-doped WOx nanowires at 10,000-fold (C) and 20,000-fold (D) magnification, respectively.
Figure 5D:
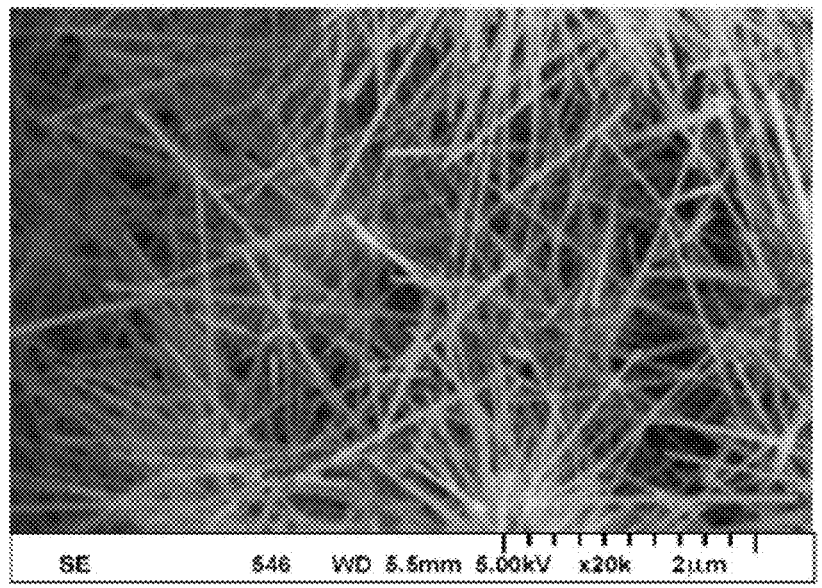
Figure 5E:
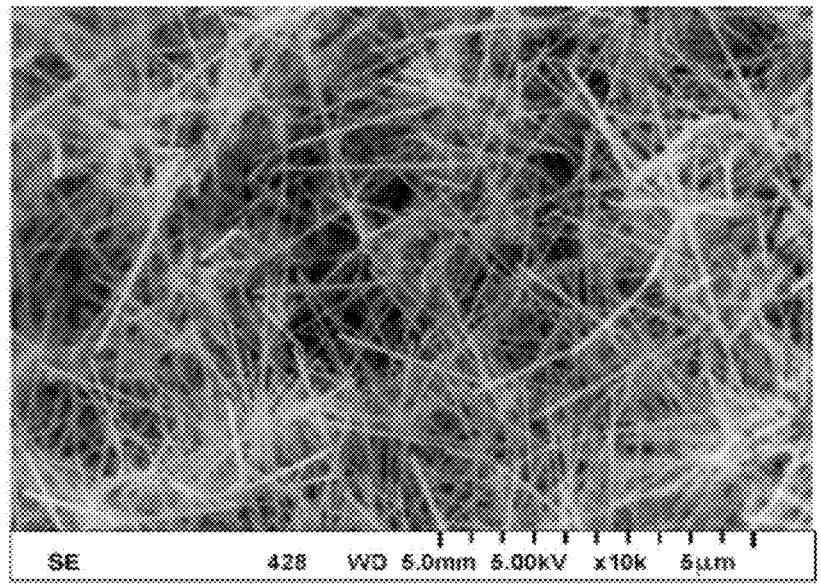
FIGS. 5E and 5F are SEM images of carbon-doped WOx nanowires, each at 10,000-fold magnification.
Figure 5F:
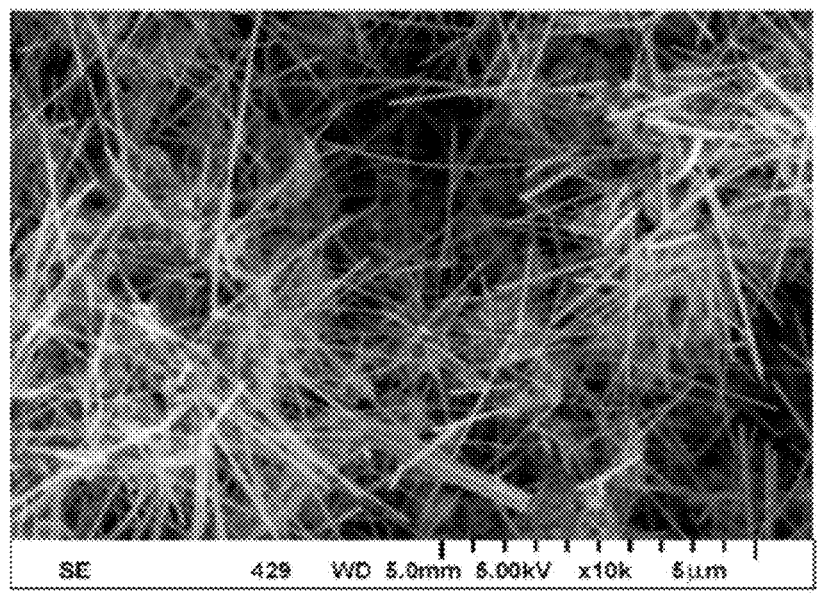
Figure 6:
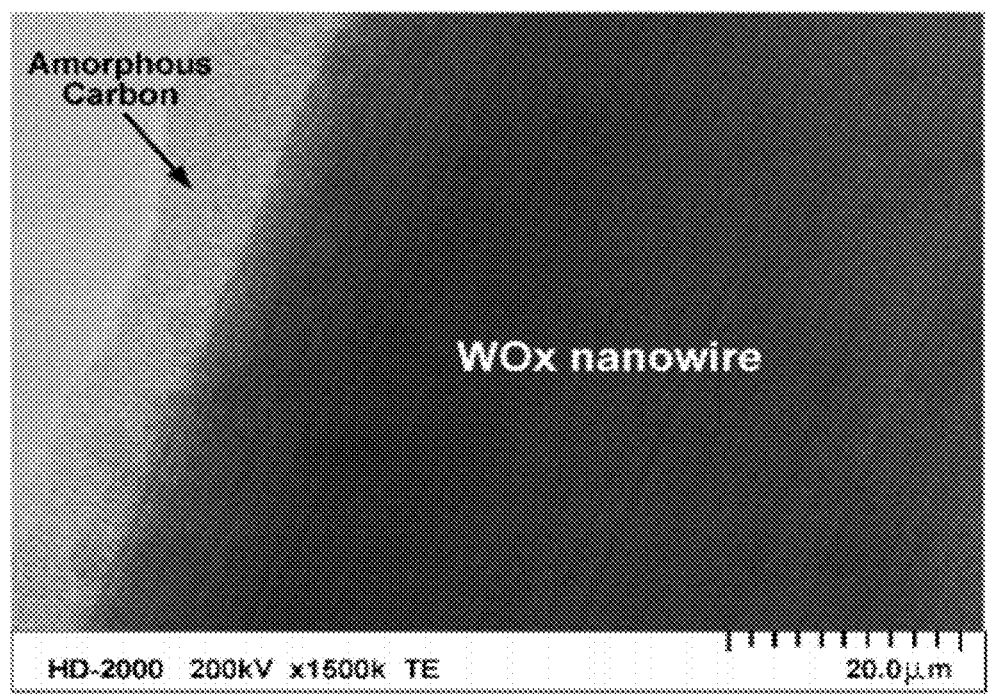
FIG. 6 is a high resolution TEM image of a carbon-doped WOx nanowire showing amorphous carbon on the surface of the nanowire.

FIGS. 5A (4,000×) and 5B (12,000×) show high-density clusters of $WO_3$ monofilaments or nanowires formed on and covering underlying tungsten powder. The $WO_3$ nanostructures are about 3-50 micrometers in length and about 100 nm in diameter. When a small amount of sulfur (molar ratio of W/S 3:1) was introduced in form of powder upstream of the tungsten powder boat (as shown in FIG. 1B), a significant increase of density and uniform has been obtained as illustrated in the SEM images of FIGS. 5C and 5D. For carbon doping, a small amount of ethylene (2 sccm) is introduced with wet Ar. The carbon-doped WOx nanostructures have similar morphologies as $WO_3$ and sulfur-doped $WO_3$ as shown in FIGS. 5E and 5F. However, HRTEM images as presented in FIG. 6 showed that carbon-doped WOx nanostructures were covered a layer of amorphous carbon.

3. Synthesis of TiOx Nanostructures

TiOx nanostructures were synthesized on Ti powder by chemical vapor deposition under conditions of 800-900° C. and Ar flow of 100-200 sccm. The results are illustrated in the SEM images of FIGS. 7A-7F.

Figure 7A:
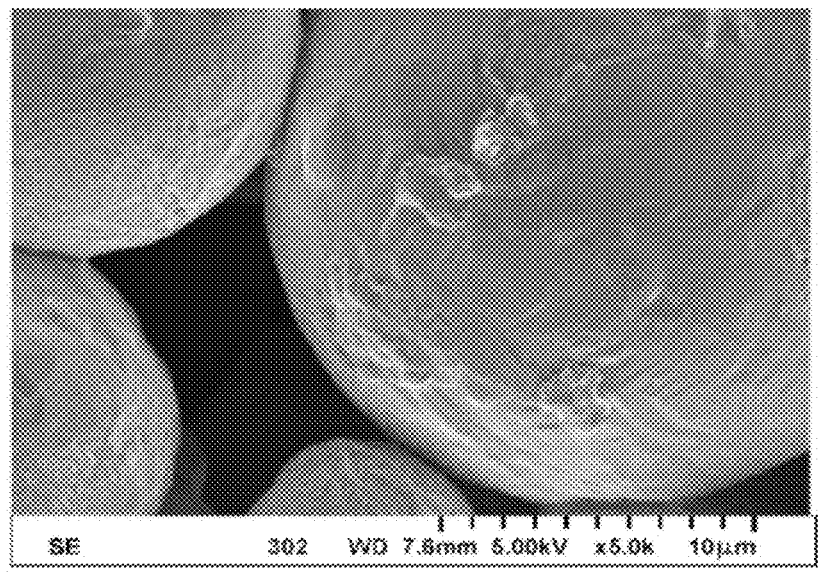
FIG. 7A is a SEM image (5000×) of original titanium powder before growing TiOx nanostructures.
Figure 7B:
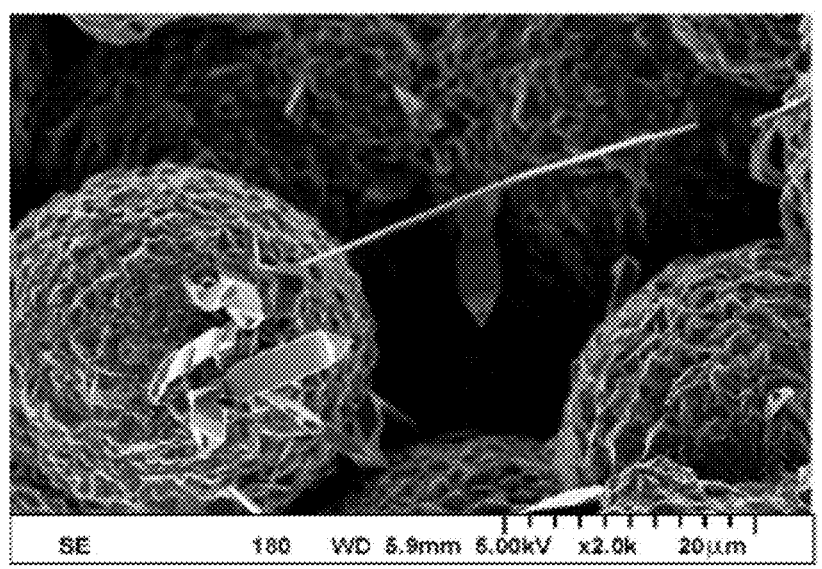
FIG. 7B is a SEM image (2000×) of a few TiOx nanostructures grown in argon on titanium powder particles. The structures were grown by CVD at 800-900° C. for 1-4 hrs.
Figure 7C:
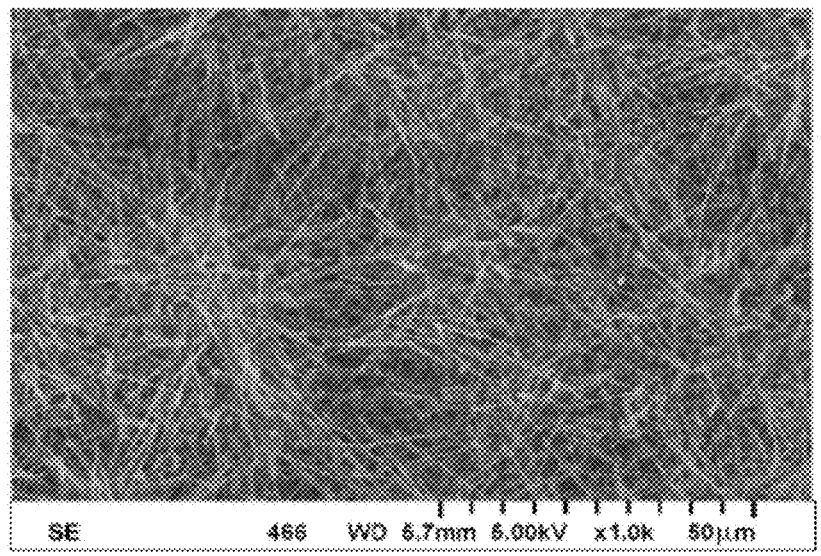
FIGS. 7C and 7D are SEM images at 1,000-fold (C) and 5,000-fold (D) magnification, respectively, of TiOx nanoneedles grown by CVD under argon with water.

FIG. 7A shows the morphology of the original Ti powder consisting of relatively large, generally spherical particles (10-15 micrometers in diameter). FIG. 7B is an SEM image of TiOx nanstructures synthesized and grown on the titanium powder particles under an oxygen-containing argon stream. It can be seen that the surfaces of the titanium particles are coarse and that they were oxidized into many polycrystalline grains. Both microwire and microbelt structures were found, although both of them are very sparse.

Figure 7D:
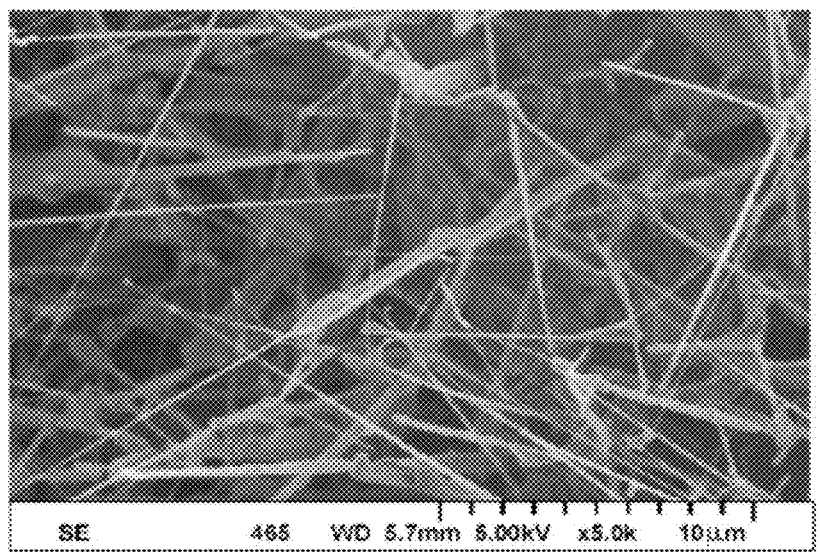

The process for forming TiOx particles on titanium powder was repeated using humidified argon. An argon stream was bubbled through a column of water at a rate of 30-80 bubbles per minutes. The humidified argon stream was then introduced into the quartz tube under the above specified conditions. As illustrated in the SEM images of FIGS. 7C (at 1000×) and 7D (5000×) very dense nanoneedles were obtained. The TiOx nanoneedles had sharp and long tips (FIG. 7D).

Figure 7E:
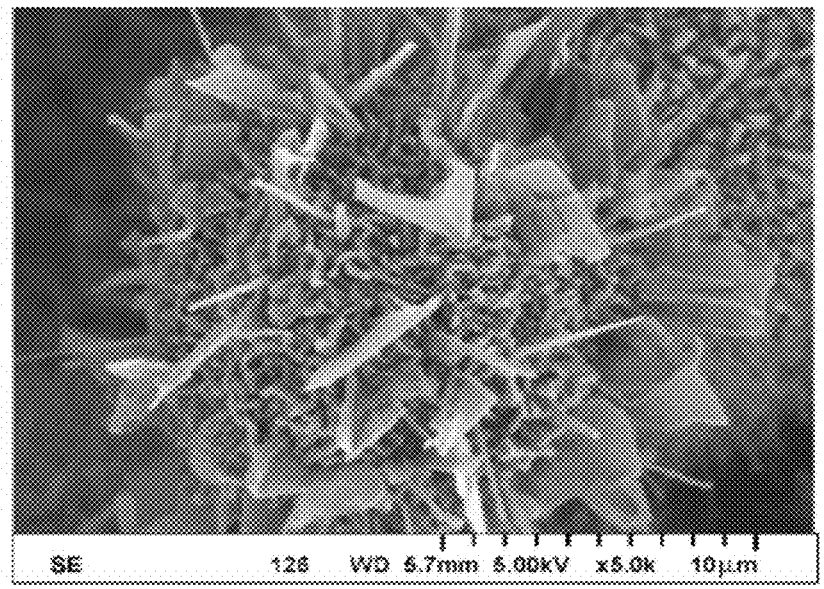
FIGS. 7E and 7F are SEM images at 5,000-fold (E) and 10,000-fold (F) magnification, respectively, of TiOx nanowall structures grown by CVD under argon with water and 20 volume percent acetone.
Figure 7F:
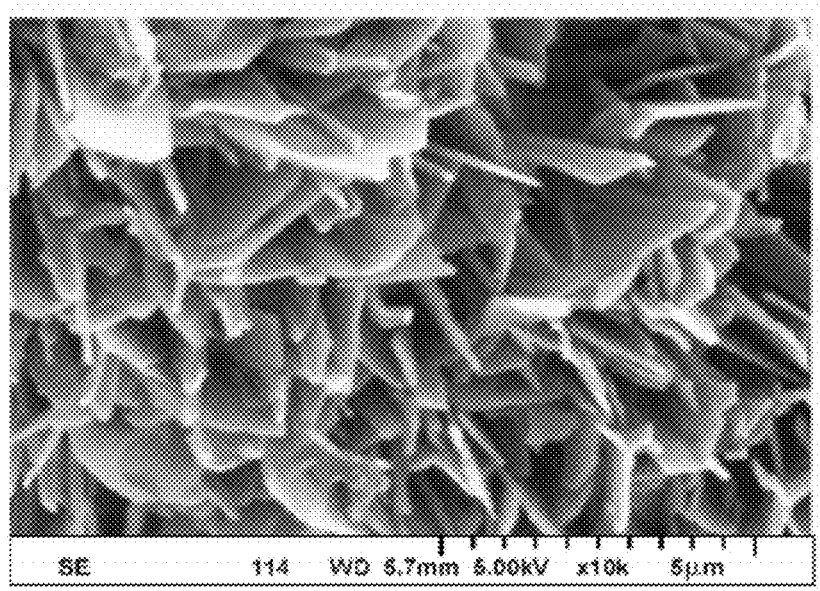

When the argon stream contained acetylene, TiOx nanostructures having a new feature (called nanowall) appeared as shown in FIGS. 7E and 7F. The nanowall structures were obtained by introducing into the flowing argon both water and 30 vol. % acetone as a carbon source at 800-900° C. for 2-4 hrs.

4. General Discussion of Nanostructure Growth Mechanisms

The growth mechanisms of SnOx nanostructures are different from the mechanisms for WOx and TiOx nanostructures.

The SnOx nanostructure growth is governed by the vapor-solid (VS) mechanism. During the heating, Sn vapor is generated from the molten Sn than combines with oxygen, which comes from three sources: residual oxygen in the reaction chamber, oxygen "impurity" in the Ar gas, and surface oxygen layers on metal powders. As a first step, Sn vapor and oxygen form SnO vapor. It is well-known that SnO is metastable and will decompose into $SnO_2$ and Sn. The decomposition of SnO will result in the precipitation of $SnO_2$ nanoparticles, which are carried by the flowing Ar gas and deposited on the walls of the alumina boat or carbon paper. The nanoparticles then act as nucleation sites and initiate the growth of $SnO_2$ nanostructures via the VS mechanism. When $SnO_2$ was formed on carbon paper, the mechanism is more complicated due to the presence of carbon on the paper surface. The reaction of carbon with oxygen in the hot environment may reduce supply of oxygen and, eventually, produce Sn or SnO.

The growth mechanisms of WOx and TiOx grown on their powders are not clearly understood. At present it is believed that the presence of water in the inert gas stream is necessary to obtain either WOx or TiOx nanostructures. The titanium and tungsten powders have higher melting points than tin, and the titanium and tungsten powder produces less vapor at the operating temperatures (700° C. to 1000° C.) of the reactor. The limited vapor production may account for the formation of their respective oxide nanostructures directly on their powders.

The growth of the composites of carbon nanotubes and tin nanowires is understood as follows. When heated at 900° C. under argon gas flow, the liquid tin (mp 232° C., by 2270° C.) produces vapor transported downstream by the argon and deposited as growing liquid droplets on the graphitic fiber substrate. Two different nanostructure growth mechanisms occur simultaneously at the substrate-borne tin droplets. Ethylene vapor decomposes on the tin droplets and forms carbon nanotubes while the continued condensation of tin provides for the later formation of tin nanowires. When the reactor is cooled, the tin solidifies within the carbon nanotubes and shrinks to form the interesting carbon and tin composite nanostructures.

The practice of the invention has been illustrated by several specific examples but the scope of the invention is not limited by such illustrations.

The invention claimed is:

1. A one-dimensional tin-carbon composite nanostructure comprising:
   a single tin nanowire consisting of a single crystal of elemental tin and partially contained in one or two chemically-deposited carbon nanotubes, each nanotube having an outer diameter of between 100 nm and 200 nm, the tin nanowire having a middle section with two end sections, each end section of the tin nanowire comprising a tip, wherein at least a portion of one end section is contained in a chemically-deposited carbon nanotube, but the middle section of the tin nanowire is not contained in a carbon nanotube.

2. A one-dimensional tin-carbon composite nanostructure as defined in claim 1, wherein said chemically-deposited carbon nanotube is hollow and said tin nanowire has a substantially uniform diameter.

3. A one-dimensional tin-carbon composite nanostructure as defined in claim 1, wherein said chemically-deposited carbon nanotube consists essentially of graphitic carbon layers.

4. A one-dimensional tin-carbon composite nanostructure as defined in claim 1, wherein said chemically-deposited carbon nanotube has a length of between 5 μm and 20 μm and an outer diameter of between 100 nm and 200 nm.

5. A one-dimensional tin-carbon composite nanostructure as defined in claim 1, wherein at least a portion of each end section of the tin nanowire is contained in a chemically-deposited carbon nanotube, but the middle section of the tin nanowire is not contained in a carbon nanotube.

* * * * *